United States Patent
Yuan et al.

(10) Patent No.: US 9,331,487 B2
(45) Date of Patent: May 3, 2016

(54) METHOD AND APPARATUS FOR ISLANDING DETECTION FOR GRID TIE CONVERTERS

(71) Applicants: Zhenhuan Yuan, Shanghai (CN); Shaofeng Zhang, Shanghai (CN); Haihui Lu, Shanghai (CN); Lixiang Wei, Mequon, WI (US); Russel J. Kerkman, Milwaukee, WI (US); Richard Lukaszewski, New Berlin, WI (US); Ahmed Mohamed Sayed Ahmed, Mequon, WI (US); Robert J. Breitzmann, South Russell, OH (US)

(72) Inventors: Zhenhuan Yuan, Shanghai (CN); Shaofeng Zhang, Shanghai (CN); Haihui Lu, Shanghai (CN); Lixiang Wei, Mequon, WI (US); Russel J. Kerkman, Milwaukee, WI (US); Richard Lukaszewski, New Berlin, WI (US); Ahmed Mohamed Sayed Ahmed, Mequon, WI (US); Robert J. Breitzmann, South Russell, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 510 days.

(21) Appl. No.: 13/827,630

(22) Filed: Mar. 14, 2013

(65) Prior Publication Data
US 2014/0265596 A1 Sep. 18, 2014

(51) Int. Cl.
H02J 3/38 (2006.01)

(52) U.S. Cl.
CPC .............. *H02J 3/382* (2013.01); *H02J 3/386* (2013.01); *H02J 2003/388* (2013.01); *Y02E 10/763* (2013.01); *Y10T 307/642* (2015.04)

(58) Field of Classification Search
CPC .................... Y02E 10/763; H02J 2003/388
See application file for complete search history.

(56) References Cited

U.S. PATENT DOCUMENTS

| 6,219,623 | B1* | 4/2001 | Wills | H02J 3/383 290/40 B |
| 6,429,546 | B1 | 8/2002 | Ropp et al. | |
| 6,853,940 | B2* | 2/2005 | Tuladhar | H02J 3/38 702/108 |
| 7,016,793 | B2 | 3/2006 | Ye et al. | |
| 7,638,983 | B2* | 12/2009 | Park | H02M 5/4585 290/44 |
| 2006/0146582 | A1* | 7/2006 | Lin | H02J 3/00 363/50 |
| 2008/0204044 | A1* | 8/2008 | Ponnaluri | H02J 3/38 324/647 |
| 2010/0025995 | A1 | 2/2010 | Lang et al. | |
| 2011/0057444 | A1* | 3/2011 | Dai | H02J 3/386 290/44 |
| 2011/0187200 | A1 | 8/2011 | Yin et al. | |

(Continued)

FOREIGN PATENT DOCUMENTS

| CN | 101931219 B | 2/2013 |
| EP | 2001120 A2 | 12/2008 |

OTHER PUBLICATIONS

Yu et al.,"Modeling and designing of Phase shift Anti-islanding method using non-detection zone," Oct. 12, 2007, Solar Energy, Pergamon Press, Oxford, GB vol. 81, No. 11, pp. 1333-1339.*

(Continued)

*Primary Examiner* — Thienvu Tran
*Assistant Examiner* — Pinping Sun
(74) *Attorney, Agent, or Firm* — Fay Sharpe LLP (57) ABSTRACT

Methods and apparatus are presented for unintentional islanding detection for grid tie converters in which the phase angle disturbance is introduced by modification of grid side converter switching control signals and a mismatch of reactive power between generation and the grid load is formed upon the occurrence of unintentional islanding, where the applied phase disturbance is determined according to two pre-defined curves to form an equivalent positive feedback at different frequencies to prevent the converter from forming an island at a new stable frequency after the grid is disconnected.

20 Claims, 6 Drawing Sheets

(56) References Cited

U.S. PATENT DOCUMENTS

2011/0295437 A1* 12/2011 Lu .......................... H02P 9/105
 700/287
2012/0262129 A1* 10/2012 Lu ............................ H02P 9/10
 322/28

OTHER PUBLICATIONS

Liu et al.,"Improved SMS landing detection Method for Grid-connected Converters," Jan. 13, 2010, IET Renewable Power Generation, vol. 4, No. 1, pp. 36-42.*

"Evaluation of Islanding detection methods for photovoltaic utility-interactive power systems" Task V, Report IEA-PVPS T5-09:2002, Mar. 2002, pp. 1-59.

Jones, et al. "Investigation of Potential Islanding of Dispersed Photovoltaic Systems", Auburn University, Contractor Report, SAND87-7024, Oct. 1988, pp. 1-360.

European Search Report, Appl. No. CN14159835.9, Mailed Feb. 4, 2016, Completed Jan. 27, 2016, Munich, Germany, 12 pgs.

Yu et al., "Modeling and Design of Phase Shift Anti-Islanding Method Using Non-Detection Zone", Solar Energy, Pergamon Press., Oxford, GB, vol. 81, No. 11, Oct. 12, 2007, pp. 1333-1339.

Liu et al., "Improved SMS Islanding Detection Method for Grid-Connected Converters", IET Renewable Power Generation, vol. 4, No. 1, Jan. 13, 2010, pp. 36-42.

Kan et al., "Anti-Islanding Performance of Grid-Connected Inverters Based On Frequency Droop PLL", Power Electronics and Motion Control Conference (IPEMC), 2012, 7$^{th}$ Int'l, IEEE, Jun. 2, 2012, pp. 2129-2133.

* cited by examiner

METHOD AND APPARATUS FOR ISLANDING DETECTION FOR GRID TIE CONVERTERS

BACKGROUND

Power conversion systems are used to convert electrical power from one form to another. Grid tie converters may be used in a variety of situations in which power is converted from one form to provide power to a load and/or to a power grid. For example, grid tie converters are used to interface fuel cells, solar cells, wind energy systems, batteries and other energy storage systems with a power grid. These converters are often capable of regenerative operation, where grid power can be converted to DC power for charging batteries, or DC battery power can be converted to provide AC power to the grid. Islanding is a condition in which a portion of an area electrical power system or electric power supply (EPS) is energized solely by one or more local EPSs through associated points of common connection or points of common coupling (PCCs) while that portion of the area EPS is electrically separated from the rest of the area EPS. Islanding can be intentional or unintentional, and various standards including UL1741 and IEEE standards 929-2000 and 1547-2003 may require protection against continuous operation of an inverter or other converter and part of a utility load while isolated from them remainder of the electric utility system. In particular, continued power converter operation during unintended distributed resource islanding is generally undesirable since the utility cannot control the voltage and frequency in the island, and voltage or frequency excursions outside of acceptable ranges may damage or degrade customer equipment. Furthermore, islanding may create hazards for utility line workers by causing a line to remain energized when it is assumed to be disconnected from all energy sources. In addition, reconnection or re-closing into an island may result in line tripping or damage to distributed resource equipment or connected equipment due to out of phase closure. Accordingly various industry standards call for power converters and other distributed resources (e.g., synchronous machines, induction machines, power inverters/converters, etc.) that energize a portion of an area EPS through a PCC to detect unintentional islanding and cease to energize the area EPS.

Several different techniques have been developed for detection of unintentional islanding. However, conventional techniques have thus far been able to ensure accurate identification of unintentional islanding in grid tie converter applications, and hence a need remains for improved apparatus and methods for detecting islanding in grid tie converters.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides techniques for grid-tie converters to detect unintentional islanding effectively. A phase disturbance is introduced to modify command reference currents used by a grid side converter stage, and a mismatching of reactive power between the generation and the load is then formed upon the occurrence of the island. The applied phase disturbance is determined by the frequency which changes according to pre-defined curves and forms an equivalent positive feedback. More than one curve is applied to generate the proper phase disturbance at different frequencies. The novel combination of different forms of curves for injected phase disturbance, such as sine and tangent curves may be advantageously employed to prevent the converter from forming the island at a new stable frequency which is still within the nominal operation range after the grid is disconnected. In certain implementations, the use of a sine curve is primarily used around the nominal frequency, and therefore there is no concern about the frequency shift being within the normal range upon islanding. Tangent curves advantageously force the frequency away from the normal range for detection of islanding conditions not ascertainable using conventional techniques. The peak phase disturbance of the sine disturbance can be set at a low value so that it has little impact on the system under grid-tie condition when the frequency has only a small variation.

In accordance with one or more aspects of the present disclosure, unintentional islanding detection methods are provided, along with computer readable mediums having computer executable instructions for detecting unintentional islanding in a distributed power system. The method includes measuring the frequency of a point of common coupling voltage, and determining first and second phase angle disturbance values according to the measured frequency and corresponding first and second phase angle disturbance functions. In certain embodiments, the first phase angle disturbance function is a sine function, and the second phase angle disturbance function is a tangent function. The method further includes computing a final phase angle disturbance value according to the first and second phase angle disturbance values, for example, according to the larger absolute value of the first and second phase angle disturbance values. In addition, the method involves modifying or adjusting one or more grid side converter current control command reference values according to the final phase angle disturbance value, and generating switching control signals for operating a grid side converter based at least partially on the grid side converter current control command reference value or values. The frequency at the point of common coupling is again measured, and unintentional islanding in the distributed power system is selectively detected based on the measured frequency of the voltage at the point of common coupling, for example, by identifying islanding if the measured frequency differs from a nominal grid frequency by more than a threshold value.

In accordance with further aspects of the present disclosure, a grid tie power converter is provided, which includes a grid side converter stage, as well as a grid side controller with a phase angle disturbance component and a switching control component. The grid side converter stage includes switching devices coupled between the point of common coupling of a distributed power system and a DC bus, and the grid side controller provides the switching control signals to the grid side converter stage. The phase angle disturbance component is operative to determine a first phase angle disturbance value according to the frequency of a voltage at a point of common coupling and according to a first phase angle disturbance function. In addition, the phase angle disturbance component determines a second phase angle disturbance value according to the measured frequency and a second phase angle disturbance function, and computes a final phase angle disturbance value according to the first and second phase angle disturbance values. The switching control component is operative to adjust one or more grid side converter current control command reference values according to the final phase angle disturbance value, and to generate the grid side converter switching control signals for operating the grid side converter according to the grid side converter current control command reference value(s). The grid side controller is further operative to selectively detect unintentional islanding in the distributed power system at least partially according to the measured frequency of the voltage at the point of common coupling.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale.

Detection of unintentional islanding is important function of grid tie converters to mitigate or avoid system equipment damage or degradation and to ensure or facilitate safety of maintenance and engineering personnel. Various techniques have previously been proposed for detection of islanding, including reactive protection, and active approaches using a grid-connected inverter or external devices. Reactive protection techniques utilize voltage and frequency relays for anti-island protection by measuring electrical variables at the point of common coupling (PCC) and detecting conditions that indicate formation of an island. In some cases, however, the reactive scheme protection is unable to detect islanding where the generator is able to carry the load of the island without substantial change in voltage or frequency. Active approaches may employ inverter frequency and/or amplitude of voltage at PCC drift away from a nominal frequency and/or voltage range to trip an internal frequency and/or voltage relay. However, certain islanding situations allow an inverter to establish a new stable operating frequency that is somewhat close to the normal frequency range, whereby internal frequency relays may not be tripped even though an islanding situation has occurred. The use of external devices to actively inject current signals with certain frequencies other than the fundamental frequency facilitates measurement of voltage at those frequencies to detect islanding by examining impedance changes. However, these techniques do not adequately detect all possible islanding situations.

U.S. Pat. No. 7,016,793, issued Mar. 21, 2006 and incorporated herein by reference, involves injection of a disturbance into the system through the synchronously rotating dq-frame current controller, and monitors the disturbance impact at the PCC. By using positive feedback in the d- and/or q-axis, the voltage and/or frequency is driven away. US patent application publication number 2011/0187200, published Aug. 4, 2011 and incorporated herein by reference, describes introduction of a small perturbation to the output current phase. If the grid is connected, the frequency of the voltage will not be changed, whereas the frequency of the voltage will deviate from the nominal frequency due to the perturbation if an islanding condition exists. A covariance index is calculated which correlates the phase shift in current to the frequency change in voltage, and if the index exceeds a threshold, a larger perturbation is introduced to the phase of the current, which will drive the frequency out of an over/under frequency protection window. US patent application publication number 2008/0204044, published Aug. 28, 2008 and incorporated herein by reference, involves introducing a reactive current reference square wave, detecting load voltage changes at every change in the reactive current reference wave, and determining whether the detected load voltage changes exceed a predefined islanding detection threshold. US patent application publication number 2006/0146582, published Jul. 6, 2006 and incorporated herein by reference, involves determining a current output frequency $fI_k = fV_{fk} + S^* \Delta f_0$, where $fI_k$ is a predetermined output current frequency at the $K^{th}$ sampling cycle, $fV_k$ is a voltage frequency at the $K^{th}$ sampling cycle, $fV_{fk}$ is a voltage frequency filtered by a IIR filter at the $K^{th}$ sampling cycle, $\Delta f_0$ is a small current frequency variation, S is 1 if $fV_k - fV_{k-1} > 0$, 0 if $fV_k - fV_{k-1} = 0$, −1 if $fV_k - fV_{k-1} < 0$. A weight factor Ws can be designed for accumulating or strengthening the detection: $fI_k = fV_{fk} + S^* F(Ws)$, where F(Ws) is a function of the feedback weight factor, and where the weight factor can be a step function, a linear function, an exponential function or a polynomial function. Similarly, the phase angle can be calculated by $\phi I_K = \phi I_{K-1} + S^*\Delta\phi_0$, where $\phi I_K$ and $\phi I_{K-1}$ are predetermined output phase angle at the $K^{th}$ sampling cycle, respectively, $\Delta\phi_0$ is a variation of a small phase angle disturbance. Also, a weight factor Ws can be designed as $\phi I_k = \phi I_{k-1} + S^*F(Ws)$. U.S. Pat. No. 6,429,546, issued Aug. 6, 2002 and incorporated herein by reference, describes reducing the size of a non-detection zone in a grid-connected power system having an electrical power generator with an interface to the grid. This reference describes measuring frequency deviation between an output signal of the grid and an output signal of the grid-connected power system; applying the measured frequency deviation to the output signal of the grid-connected power system; and when the measured frequency of the output signal of the grid-connected power system satisfies an established cut-off level, disconnecting the grid-connected power system. So-called Slip Mode Frequency Shift (SMS) techniques use positive feedback to destabilize a distributed resource (DR) when the grid is not present so as to force the frequency to deviate from the nominal value. This technique applies positive feedback to the phase of the output current and thereby the frequency of voltage at the PCC in the short term. However, these approaches have not provided adequate assurance that all unintentional islanding situations are timely detected.

The present disclosure advantageously employs two or more phase disturbance curves or functions to introduce a phase disturbance into the grid-side converter output of a grid tie converter for intelligent detection of islanding conditions, where the phase angle disturbance with the larger absolute value of the two phase angle disturbances computed according to these curves is used for introduction of the disturbance. In this manner, the operating frequency is driven away from otherwise stable operating points to facilitate detection of islanding conditions in situations in which conventional techniques were inoperative and/or slow. The disclosed techniques and apparatus may be employed in any form of grid tie converter that performs power conversion functions using at least one power converter stage connected to a point of common coupling. Examples of such converters used in interfacing wind power systems are shown in US patent application publication number 2011/0295437 to Lu et al., published Dec. 1, 2011 and assigned to the assignee of the present disclosure Rockwell Automation Technologies, Inc., and US patent application publication number 2012/0262129 to Lu et al., published Oct. 18, 2012 and assigned to the assignee of the present disclosure, the entireties of which are hereby incorporated by reference herein.

Figure 1:
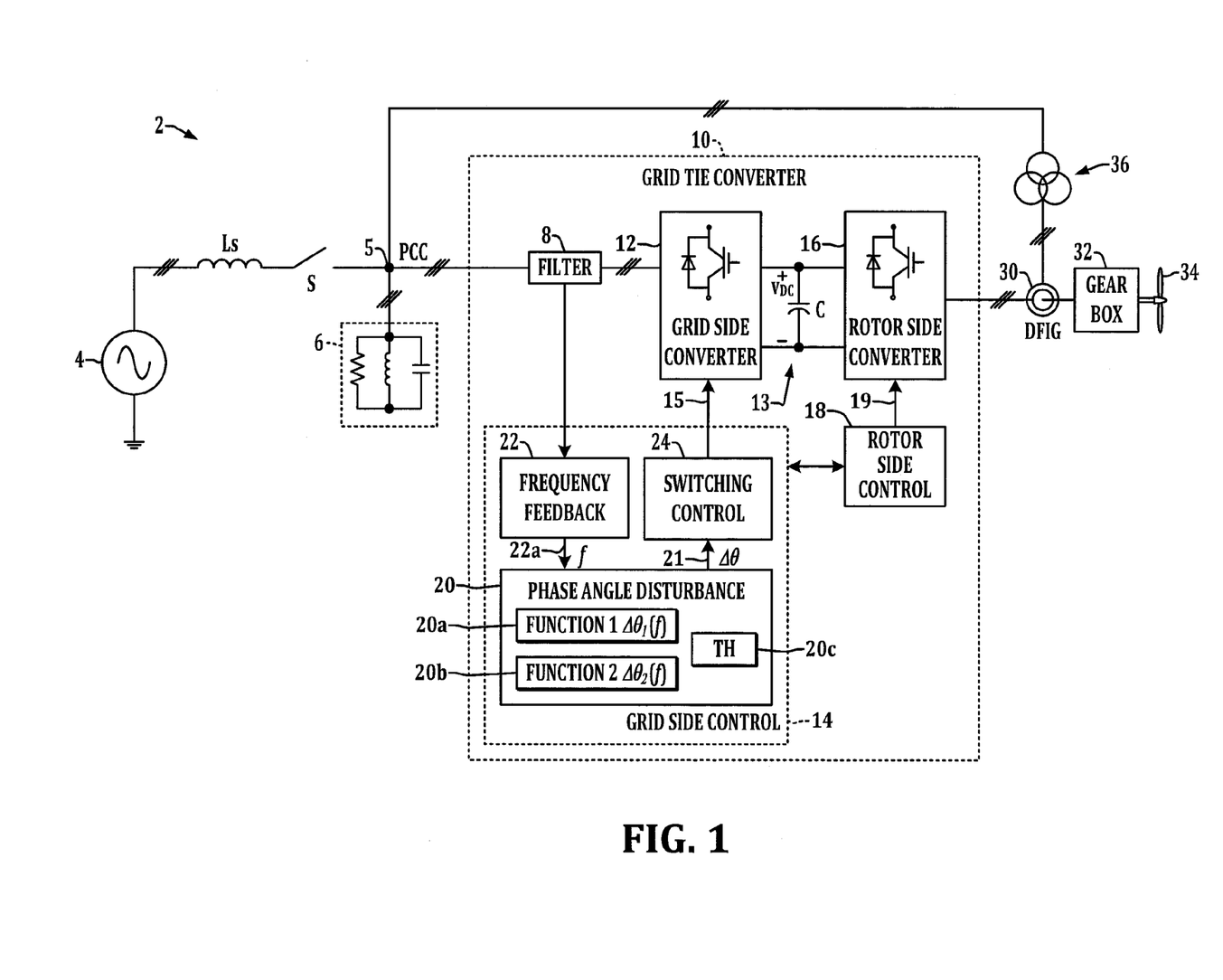
FIG. 1 is a schematic diagram illustrating an exemplary distributed power system including a grid tie converter interfacing a doubly fed induction generator (DFIG) based wind energy conversion system (WECS) with a power grid, and including phase angle disturbance generation components to selectively inject a phase angle disturbance using two different curves to prevent the converter from forming an island at a new stable frequency which is still within the nominal operation range after the grid is disconnected according to one or more aspects of the present disclosure.

FIG. 1 illustrates an exemplary grid system 2 including a grid power source 4 and an associated source inductance Ls which is typically connected to an illustrated point of common coupling 5, where the figure illustrates a switch S representing the possibility that the grid source 4 can be disconnected from the PCC 5 to create an islanding situation. As noted above, such islanding may occur unintentionally, whereby the source 4 is effectively disconnected or isolated from the point of common coupling 5. As seen in FIG. 1, an RLC load 6 may be connected with the PCC 5, and includes a line-to-line resistive component, inductive component and capacitive component, shown simply as a resistor, an inductor, and a capacitor connected in parallel with one another for illustrative purposes to represent the complex impedance of all loads that may be present on the power transmission line in a distributed power system 2.

Also coupled with the point of common coupling 5 is a grid tie converter 10, in this case an exemplary wind energy converter (WEC) or wind energy system (WES) with a doubly fed induction generator (DFIG) conversion system 30 converting mechanical power from a wind turbine 34 via a gearbox 32 driving a rotor of the DFIG 30. The stator of the DFIG 30 in the embodiment of FIG. 1 is connected to the point of common coupling 5 via a three-phase transformer 36 as shown, and the rotor windings of the DFIG 30 are coupled to a rotor side converter 16 of the grid tie converter 10. The DFIG rotor provides rotor windings (single or multi-phase) for transfer of AC power between the rotor and a back-to-back DFIG converter 10 which includes the rotor side converter 16 and a DC bus 13 with a DC link capacitor C providing a DC bus voltage $V_{DC}$ to a grid side converter 12. The converter 10 may alternatively be a current source converter, for example, having a DC link circuit 13 with one or more DC link chokes or inductances (not shown) and without the capacitor C. The grid side converter stage 12 is coupled to the point of common coupling 5 as shown through a multiphase filter circuit 8 (e.g., a three-phase LC filter, LCL filter, three line inductors L, etc.), or the grid side converter 12 may be directly connected to the point of common coupling 5 with the filter 8 being omitted in other implementations. The grid tie converter 10, moreover may, but need not, include a transformer (not shown). The grid tie converter can also be applied to a permanent magnet synchronous generator (PMSG), a synchronous generator (SG), or an induction generator (IG). In certain embodiments, the grid tie converter may include only the grid side converter and be applied to solar cell arrays, fuel cell stacks or batteries.

The illustrated grid tie converter 10 is a dual-mode, back-to-back structure with the rotor side converter circuit 16 coupled between the DFIG rotor connection and the DC intermediate circuit 13 with corresponding switching devices (e.g., IGBTs or other suitable switching devices) coupled between the DFIG rotor leads and the DC bus 13. The grid side converter circuit 12 is coupled between the DC bus 13 and the DFIG stator connection via the PCC 5 and the transformer 36, and includes a switching circuit with a plurality of switches (e.g., IGBTs or other suitable switching devices). The converter 10 in this example operates in dual mode fashion with the rotor side converter 16 providing power from the rotor connection to the DC circuit 13 in a first mode and providing power from the DC circuit 13 to the DFIG rotor in a second mode with the rotor side converter switches being operated as a switching inverter. In the first mode, moreover, the grid side converter circuit 12 operates as an inverter to provide power from the DC circuit 13 to the PCC 5 and hence to the DFIG stator by operation of the grid side converter switching devices. In the second mode, the grid side converter 12 rectifies power from the PCC 5 to charge the capacitor C of the DC bus 13, where rectifiers and IGBTs of the grid side converter 12 work together to allow bidirectional power flow in the second (PWM switching) mode. In operation, the grid tie converter mode may be set according to the rotor speed, with current from the DFIG rotor being used in the first mode to power the DC circuit 13 and the grid side converter 12 operating as an inverter to supply power to the grid when the rotor speed is above the nominal value corresponding to the grid frequency. In the second mode for rotor speeds below the nominal rotational speed, a portion of the stator power is fed to the rotor via the converter stages 12 and 16, with the grid side converter stage 12 operating as a rectifier to supply power to the intermediate circuit 13 and the rotor side stage 16 inverting the DC power to provide power to the DFIG rotor windings.

As seen in FIG. 1, the grid tie converter 10 includes a grid side controller 14 providing grid side converter switching control signals 15 to the switching devices of the grid side converter 12, as well as a rotor side controller 18 providing rotor side switching control signals 19 to the rotor side converter 16. The converter 10 also includes one or more sensors and/or feedback elements operative to provide various operational feedback signals to one or both of the controllers 14, 18. In this case, voltage sensing devices (not shown) may be operatively associated with the input and/or output or internal nodes of the filter 8 in order to provide voltage feedback signals or values indicative of the voltage(s) at the point of common coupling 5. As seen in FIG. 1, for instance, such voltage feedback signal or signals is/are provided to a frequency feedback component 22 of the grid side controller 14, which provides a measured frequency signal or value 22a to a phase angle disturbance component 20 of the grid side controller 14. The phase angle disturbance component 20 includes first and second phase angle disturbance functions 20a and 20b, as well as a threshold value 20c, and uses these along with the measured feedback 22a (f) to provide a computed final phase angle disturbance value $\Delta\theta$ to a switching control component 24 that generates the grid side converter switching control signals 15.

In operation, the phase angle disturbance component 20 determines a first phase angle disturbance value $\Delta\theta_1$ according to the measured frequency f and the first phase angle disturbance function 20a, and also determines a second phase angle disturbance value $\Delta\theta_2$ according to the measured frequency f and the second phase angle disturbance function 20b. With these, the phase angle disturbance component 20 computes the final phase angle disturbance value $\Delta\theta$ according to the first and second phase angle disturbance values $\Delta\theta_1$, $\Delta\theta_2$. As described further below, moreover, the switching control component 24 adjusts one or more grid side converter current control command reference values $i_{qref}$ and $i_{dref}$ according to the final phase angle disturbance value $\Delta\theta$, and generates the grid side converter switching control signals 15 for operating the grid side converter 12 according to the adjusted current control command reference value(s). In addition, the grid side controller 14 selectively detects unintentional islanding in the distributed power system 2 (e.g., unintended opening of the switch S in FIG. 1) at least partially according to the measured frequency f of the voltage at the point of common coupling 5. In this manner, the grid tie converter 10 selectively detects unintended islanding in the system 2, and can take one or more remedial or reporting actions based on this detection, such as stopping power generation from the DFIG via the converter 10, issuing warning messages to other devices via network connections, etc.

Figure 2:
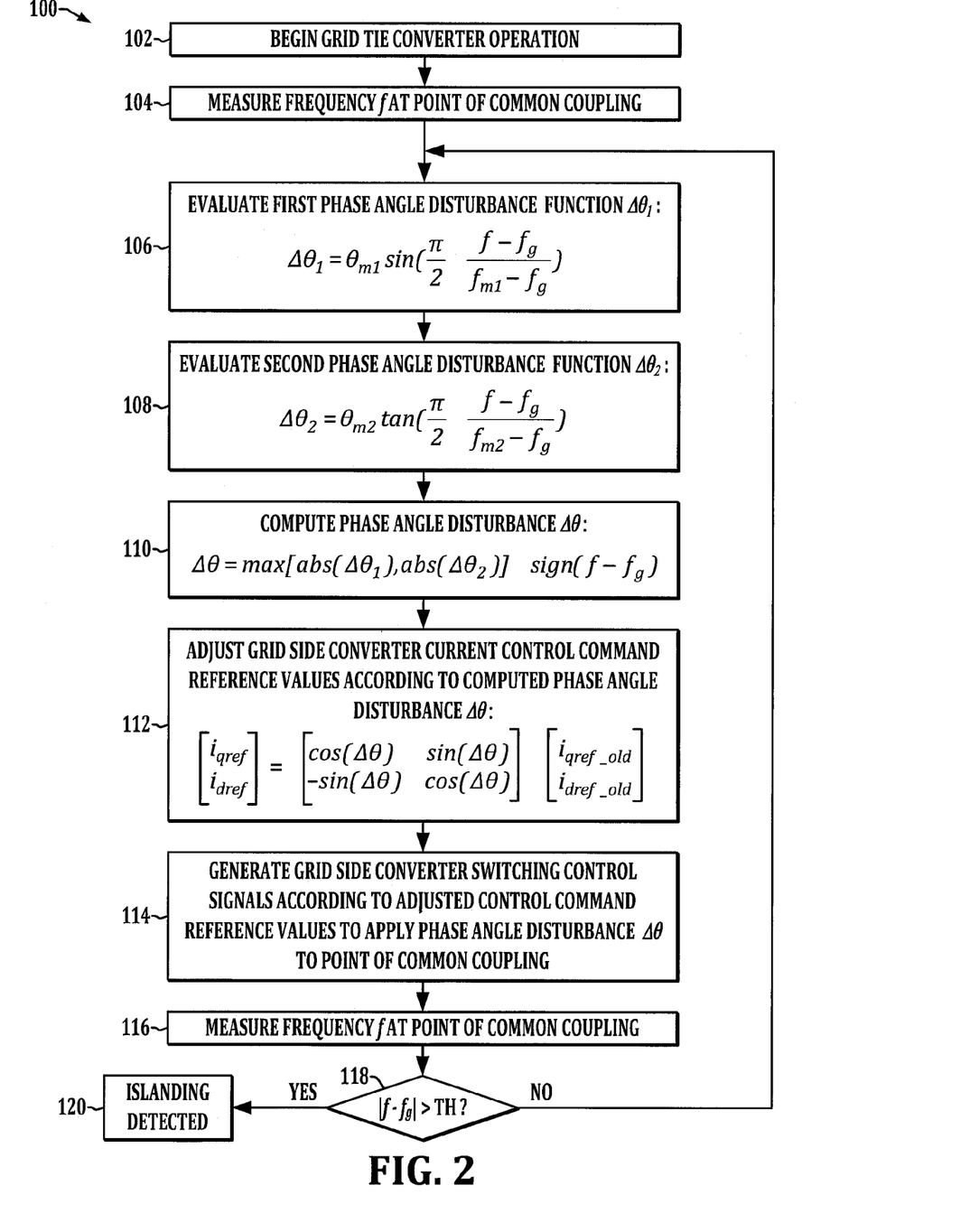
FIG. 2 is a flow diagram illustrating an exemplary process or method for detecting unintentional islanding using first and second phase angle disturbance curves or functions in accordance with further aspects of the present disclosure.

FIG. 2 illustrates an exemplary method 100 for detecting unintentional islanding using the first and second phase angle disturbance curves 20a and 20b in accordance with the present disclosure, where the grid side controller 14 of FIG. 1 may in certain embodiments be operated according to the method 100. In this regard, the controller 14 includes at least one processor programmed to perform the process 100 via the phase angle disturbance component 20 and the switching control component 24, which may be implemented using hardware, processor-executed software, processor-executed firmware, programmable logic, or combinations thereof, etc., with program instructions being stored in a memory associated with the grid side controller 14. In this regard, the exemplary method 100 of FIG. 2 may be implemented using computer executable instructions from a non-transitory computer readable medium, such as a computer memory, a memory within a power converter control system (e.g., controller 14), a CD-ROM, floppy disk, flash drive, database, server, computer, etc. which has computer executable instructions for performing the processes and controller functionality described herein. While the exemplary method 100 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide the islanding detection concepts disclosed herein.

The operation of the grid tie converter 10 begins at 102 in the method 100 of FIG. 2, with the frequency of a voltage at the PCC 5 being measured at 104. At 106, a first phase angle disturbance value $\Delta\theta_1$ is determined at least partially according to the measured frequency f and according to the first phase angle disturbance function 20a, and a second phase angle disturbance value $\Delta\theta_2$ is determined at 108 at least partially according to the measured frequency f and the second phase angle disturbance function 20b.

At 110, a final phase angle disturbance value $\Delta\theta$ is computed or otherwise determined at least partially according to the first and second phase angle disturbance values $\Delta\theta_1$ and $\Delta\theta_2$. In certain embodiments, the final phase angle disturbance value $\Delta\theta$ is computed 110 according to the larger absolute value of the first and second phase angle disturbance values $\Delta\theta_1$ and $\Delta\theta_2$. For example, the illustrated phase angle disturbance component 20 advantageously computes the final phase angle disturbance value $\Delta\theta$ according to the following formula (1):

$$\Delta\theta = \max[\text{abs}(\Delta\theta_1), \text{abs}(\Delta\theta_2)] * \text{sign}(f-f_g), \qquad (1)$$

where $\Delta\theta_1$ is the first phase angle disturbance value, $\Delta\theta_2$ is the second phase angle disturbance value, f is the measured frequency at the PCC 5, $f_g$ is the nominal grid frequency (e.g., 50 Hz in one implementation), and sign is the sign function with 1 for $f > f_g$, 0 for $f = f_g$, and $-1$ for $f < f_g$.

One or more grid side converter current control command reference values $i_{qref}$, $i_{dref}$ are selectively adjusted at 112 according to the final phase angle disturbance value $\Delta\theta$. At 114, grid side converter switching control signals 15 are generated for operating the grid side converter 12 according to the grid side converter current control command reference value or values $i_{qref}$, $i_{dref}$. The frequency at the PCC 5 is again measured at 116. A determination is made at 118 as to whether the measured frequency f is within a threshold value TH (e.g., threshold 20c in the phase angle disturbance component 20 of FIG. 1) of a nominal grid frequency (e.g., 50 Hz or 60 Hz in certain implementations). If so (NO at 118) the process repeats again at 106 as described above, and otherwise (YES at 118), unintended islanding is detected at 120. In certain embodiments, unintentional islanding in the distributed power system 2 is detected at 120 if the measured frequency f of the voltage at the point of common coupling 5 differs from a nominal grid frequency $f_g$ by more than a threshold value 20c.

Any first and second phase angle disturbance functions 20a and 20b may be employed in various implementations of the present disclosure. In the illustrated embodiments, for example, the first phase angle disturbance function 20a is a sine function, and the second phase angle disturbance function 20b is a tangent function. In this case, the first phase angle disturbance value $\Delta\theta_1$ is determined at 106 by evaluating the following first phase angle disturbance function (2) to solve for $\Delta\theta_1$ according to the measured frequency f:

$$\Delta\theta_1 = \theta_{m1} \sin((\Pi/2) * ((f-f_g)/(f_{m1}-f_g))), \qquad (2)$$

where f is the measured frequency, $f_g$ is the nominal grid frequency, $f_{m1}$ is a predetermined first frequency different from the nominal grid frequency $f_g$, and $\theta_{m1}$ is a predetermined first phase angle. In this case, moreover, the phase angle $\theta_{m1}$ and the frequency $f_{m1}$ are selected to meet the inequality $d(\Delta\theta_1)/df > d(\Delta\theta_{RLC})/df$, where $\theta_{RLC}$ is an RLC load phase angle associated with the RLC load 6 determined according to the following function (3):

$$\theta_{RLC} = -a\tan[((R/\omega L_{QF=1}) - R\omega C_{QF=1})*Q_F], \quad (3)$$

where $R = V^2/P$, V is the voltage at the point of common coupling, P is the power value at the point of common coupling, $\omega = 2\Pi f$, $Q_F$ is a quality factor of the RLC load 6 determined as $Q_F = R(C_{QF}/L_{QF})^{1/2}$, $L_{QF} = V^2/(2\Pi f P Q_F)$, and $C_{QF} = (PQ_F)/(2\Pi f V^2)$.

In the illustrated implementation, moreover, the second phase angle disturbance value $\Delta\theta_2$ is determined at 108 according to the measured frequency f and the following second phase angle disturbance function (4):

$$\Delta\theta_2 = \theta_{m2}\tan((\Pi/2)*((f-f_g)/(f_{m2}-f_g))), \quad (4)$$

where $\theta_{m2}$ and $f_{m2}$ are selected such that the second phase angle disturbance value $\Delta\theta_2$ is greater than the first phase angle disturbance value $\Delta\theta_1$ at a crossing point frequency, and where the crossing point frequency is a frequency where the first phase angle disturbance value $\Delta\theta_1$ is equal to the RLC load phase angle $\theta_{RLC}$.

Figure 3:
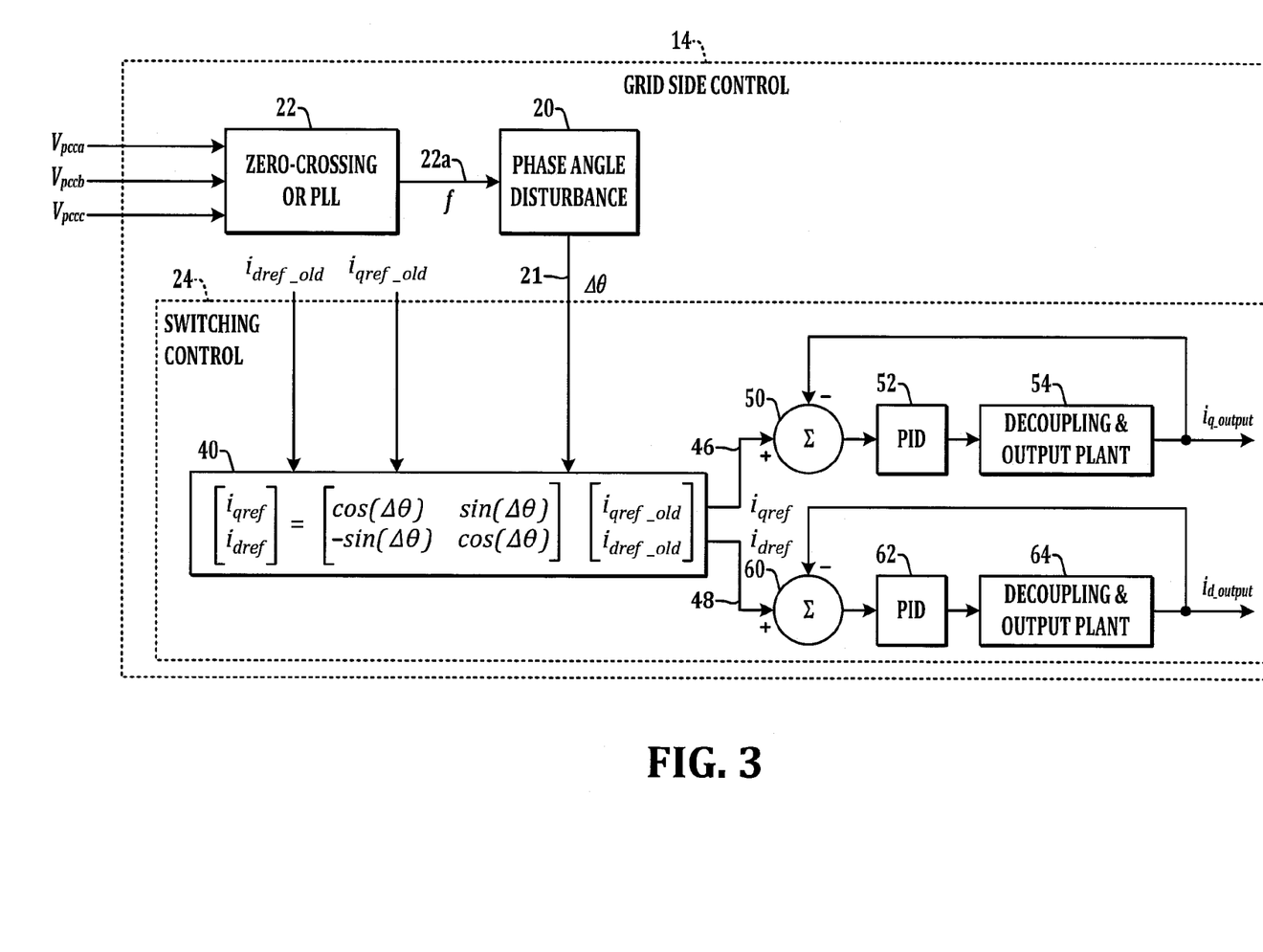
FIG. 3 is a schematic diagram illustrating further details of a grid side controller of the system of FIG. 1, including a first embodiment for introducing a phase angle disturbance by modifying or adjusting grid side converter current control command reference values according to a computed phase angle disturbance.
Figure 4:
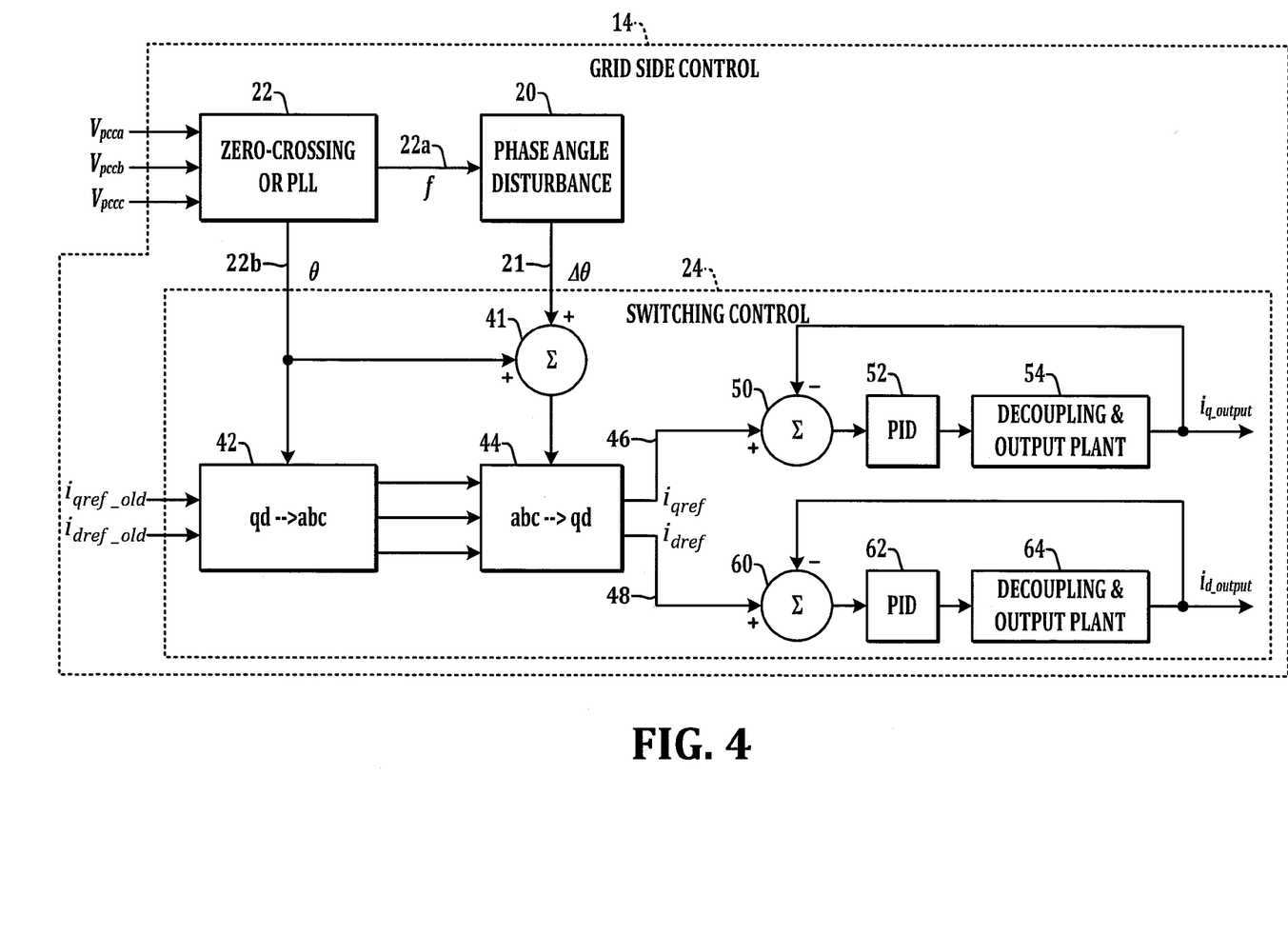
FIG. 4 is a schematic diagram illustrating another embodiment of a grid side controller to introduce a phase angle disturbance by adjustment of grid side converter current control command reference values according to the computed phase angle disturbance.

Referring also to FIGS. 3 and 4, further details of the grid side controller 14 are illustrated, in which FIG. 3 shows a first embodiment for introducing the phase angle disturbance $\Delta\theta$ by modifying or adjusting grid side converter current control command reference values according to a computed phase angle disturbance. As seen in this embodiment, the frequency feedback component 22 includes a zero-crossing or phase locked loop (PLL) component, which can be implemented in hardware, processor-executed software, processor-executed firmware, programmable logic or combinations thereof in the grid side controller 14, and which provides an output signal or value 22a indicating the measured frequency f of the voltage at the point of common coupling 5. This measured frequency signal or value 22a is received by the phase angle disturbance component 20 which provides the computed final phase angle disturbance $\Delta\theta$ as a signal or value 21 to the switching controller 24 for modification of the grid side converter switching control signals 15. In this embodiment, the computed final phase angle disturbance $\Delta\theta$ is used along with unmodified (old) grid side converter current control command reference values $i_{qref\_old}$ and $i_{dref\_old}$ by an adjustment component 40 to compute adjusted grid side converter current control command reference values $i_{qref}$ 46 and $i_{dref}$ 48 according to the following matrix equation (5):

$$\begin{bmatrix} i_{qref} \\ i_{dref} \end{bmatrix} = \begin{bmatrix} \cos(\Delta\theta) & \sin(\Delta\theta) \\ -\sin(\Delta\theta) & \cos(\Delta\theta) \end{bmatrix} \cdot \begin{bmatrix} i_{qref\_old} \\ i_{dref\_old} \end{bmatrix} \quad (5)$$

By this operation, the grid side converter current control command reference values are adjusted according to the computed phase angle disturbance $\Delta\theta$, which is then used in close loop control of the output current of the grid side converter 12. In particular, the illustrated example provides a q axis adjusted reference value 46 to a summer 50 which provides an output to a q axis PID (proportional, integral, derivative) control component 52 whose output is used by a decoupling and output plant component 54 to generate the q axis output signal or value $i_{q\_output}$ which is fed back as a subtractive input to the summer 50 and is thereafter used by the switching controller 24 to generate the switching control signals 15 to operate the grid side converter 12. Similarly, the adjustment component 40 provides an adjusted d axis reference output $i_{dref}$ 48 to a summer 60 whose output drives a d axis PID component 62 and a d axis decoupling and output plant component 64 to generate the d axis current output value $i_{d\_output}$ which is fed back as a subtractive input to the summer 60 and is also used in generating the grid side switching control signals 15.

Another non-limiting embodiment is shown in FIG. 4, in which a synchronously rotating to stationary reference frame transformation component 42 receives the unmodified grid side converter current control command reference values $i_{qref\_old}$ and $i_{dref\_old}$ as well as a phase angle output 22b $\theta$ from the zero-crossing/PLL component 22, and provides three stationary reference frame signals or values to a stationary to synchronously rotating reference frame transformation 44. In addition, a summer 41 adds the phase angle signal or value 22b ($\theta$) to the computed phase angle disturbance $\Delta\theta$, and provides the resulting summation as an input to the transformation 44, which generates the adjusted q and d axis grid side converter current control command reference values $i_{qref}$ 46 and $i_{dref}$ 48 for use by the q and d axis PID components as described above in connection with FIG. 3.

In this manner, the phase angle disturbance is introduced at the point of common coupling 5 according to the computed $\Delta\theta$ to modify the q and d axis command reference currents values $i_{qref}$ and $i_{dref}$. A mismatching of reactive power between the generation and the load is then formed upon the occurrence of islanding in the system 2. The applied phase angle disturbance, moreover, is determined by the frequency change according to pre-defined curves or functions 20a and 20b and forms an equivalent positive feedback, where the two functions or curves are applied to generate the proper phase angle disturbance at different frequencies $f_{m1}$ and $f_{m2}$ to prevent the converter 10 from forming a island at a new stable frequency within the nominal range after the grid source 4 is disconnected. Sine and tangent curves or functions 20a and 20b need not be used in all embodiments, and are merely non-limiting examples.

Referring also to FIGS. 5-8, the novel phase angle disturbance and islanding detection concepts of the present disclosure can be advantageously employed in a grid tie converter 10 to provide a robust system for detecting unintended islanding in a distributed power system 2 while providing only a small impact on normal operation. In particular, the illustrated sine and tangent curves or functions 20a and 20b facilitate operation in which the disturbance will be small or zero when the frequency f is around nominal value in normal operation (e.g., 50 Hz in one example). This is particularly advantageous since IEEE std. 1547 requires the current flowing into the grid to be less than 2% rated current of power converter under the balanced condition. Moreover, the disclosed concepts facilitate an island operating frequency to be self-driven away from new stable points that are still within the normal frequency range by the inherent positive feedback mechanism by providing a phase angle disturbance large enough to force the frequency to keep moving. These techniques are also applicable to loads with high quality factor, and the methods and apparatus can be tuned according to a given required quality factor $Q_F$. In this regard, a balanced power condition is the worst case for islanding detection, but the concepts of the present disclosure are particularly robust where the phase angle of grid side converter 12 is larger than the phase angle of the RLC load 6 during an islanding condition.

Figure 5:
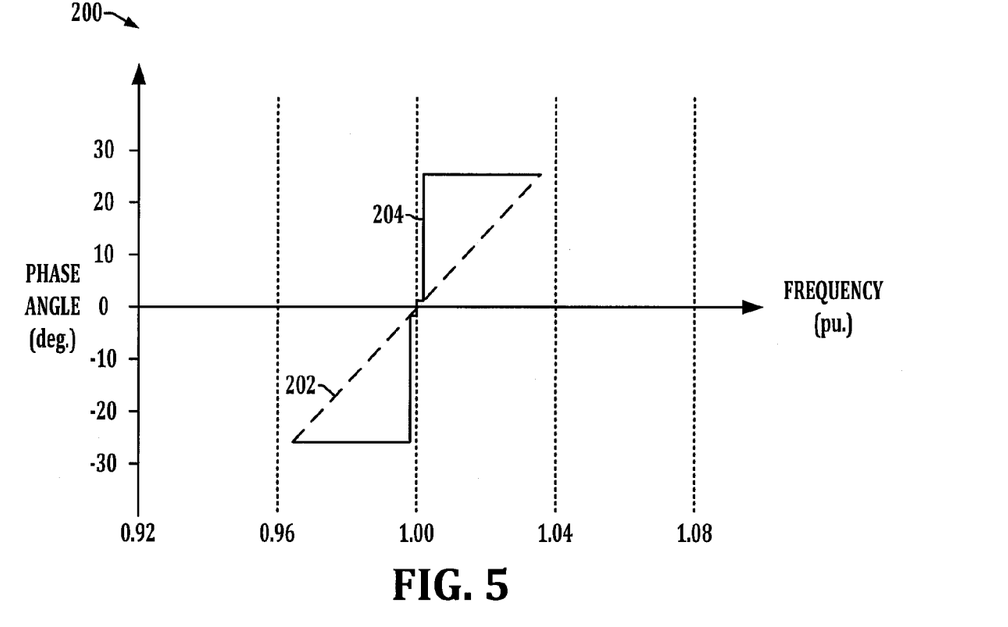
FIG. 5 is a graph illustrating phase angle versus frequency curves showing an RLC load curve for a given portion of a distributed power system and a curve showing a balanced power condition in which currents flowing into the grid are less than 2% rated current of grid-tie converter as well as the limit of phase angle disturbance.

A graph 200 in FIG. 5 illustrates phase angle vs. frequency curves 202 and 204 showing an RLC load curve 202 for a given portion of a distributed power system 2, as well as a curve 204 showing a balanced power condition in which less than 2% of the current flows into the grid and the limit of phase angle disturbance. Sine waveforms or functions 20a can be designed to make the first phase angle disturbance ($\Delta\theta_1$) larger than the load curve 202 with specific and high enough quality factors $Q_F$, for example, a quality factor $Q_F$=10 (equivalent power factor=0.1), around a nominal frequency (e.g., 50 Hz). However, the crossing point (stable point) may be still within the frequency threshold. In this case, a tangent waveform or formula 20b can be used to force the frequency to keep moving from the stable point and speed up the frequency change during islanding. This may reduce the difference of islanding detection times at different capacity mismatching points (e.g., % of C mismatching).

Figure 6:
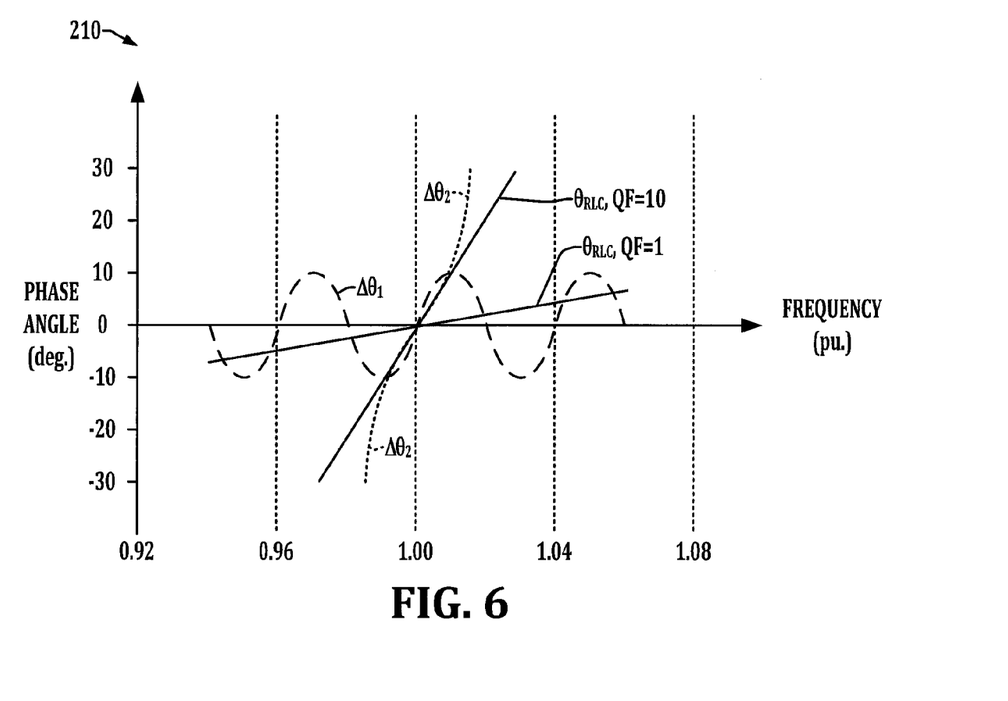
FIG. 6 is a curve illustrating two exemplary RLC phase angle load curves as a function of frequency for two different quality factor situations, as well as first and second phase angle disturbance curves corresponding to sinusoidal and tangent functions.

FIG. 6 illustrates a graph 210 with RLC load phase angle curves ($\theta_{RLC}$) as a function of frequency around a nominal grid operating frequency (1.00 pu.) corresponding to quality factors of 1 and 10 as shown. In addition, the graph 210 in FIG. 6 illustrates an exemplary phase angle disturbance ($\Delta\theta_1$) as a function of frequency computed using a sine function 20a, as well as an exemplary phase angle disturbance ($\Delta\theta_2$) computed using a tangent function 20b. In this case, the sine curve or function 20a is used around the nominal frequency (1.00) where $\theta_{m1}$ is the phase angle disturbance when the frequency (f) at the PCC 5 reaches the value of $f_{m1}$. The tangent function 20b is used after the frequency exceeds the designed point, where $\theta_{m2}$ is the phase angle disturbance when the frequency (f) at the PCC 5 reaches the value of $(f_{m2}+f_g)/2$. Other forms of curves or functions can be applied according to the load characteristics or application conditions.

To illustrate, the pre-defined phase angle disturbance curves or functions 20a and 20b can be determined by selecting a specific quality factor, for example, high enough to cover the possible load 6, and then selecting $\theta_{m1}$ and $f_{m1}$ so as to ensure positive feedback once the frequency deviates due to islanding, and hence to ensure that the frequency will move away from the nominal point during actual islanding conditions. In one example, these values are selected in order to satisfy the following inequality (6):

$$d(\Delta\theta_1)/df > d(\Delta\theta_{RLC})/df, \quad (6)$$

where $\theta_{RLC}$ is the RLC load phase angle associated with the RLC load 6 determined as $\theta_{RLC} = -a\tan[((R/\omega L_{QF=1}) - R\omega C_{QF=1})*Q_F]$, and where $R=V^2/P$, V is the PCC voltage and P is the PCC power, $\omega=2\Pi f$, and $Q_F$ is the quality factor of the RLC load 6 determined as $Q_F=R(C_{QF}/L_{QF})^{1/2}$, $L_{QF}=V^2/(2\Pi fPQ_F)$, and $C_{QF}=(PQ_F)/(2\Pi fV^2)$.

Based on the corresponding RLC load phase angle curve ($\theta_{RLC}$) for the selected quality factor $Q_F$, $\theta_{m2}$ and $f_{m2}$ are selected so that the second phase angle disturbance value $\Delta\theta_2 > \Delta\theta_1$ at the crossing point frequency where the first phase angle disturbance value $\Delta\theta_1$ is equal to the RLC load phase angle $\theta_{RLC}$. In this regard, this inequality ensures that there is no crossing point between the RLC load 6 and the tangent function 20b after the frequency of the crossing point of the RLC load & functions, for example, at 50.433 Hz in one case using a nominal grid frequency of 50 Hz, as seen in the example of FIG. 6. The disclosed technique (e.g., see equation (1) above) computes the final phase angle disturbance value $\Delta\theta$ according to the larger absolute value of the first and second phase angle disturbance values $\Delta\theta_1$ and $\Delta\theta_2$, thereby ensuring that the operating frequency f will continue to increase during islanding conditions. In one possible implementation for a specified quality factor of 10 and a nominal grid frequency of 50 Hz, this approach provides $\theta_{m1}=10°$, and $f_{m1}=50.5$ Hz for the sine function 20a, and $\theta_{m2}=12.5°$ and $f_{m2}=51$ Hz for the tangent function 20b.

Figure 7:
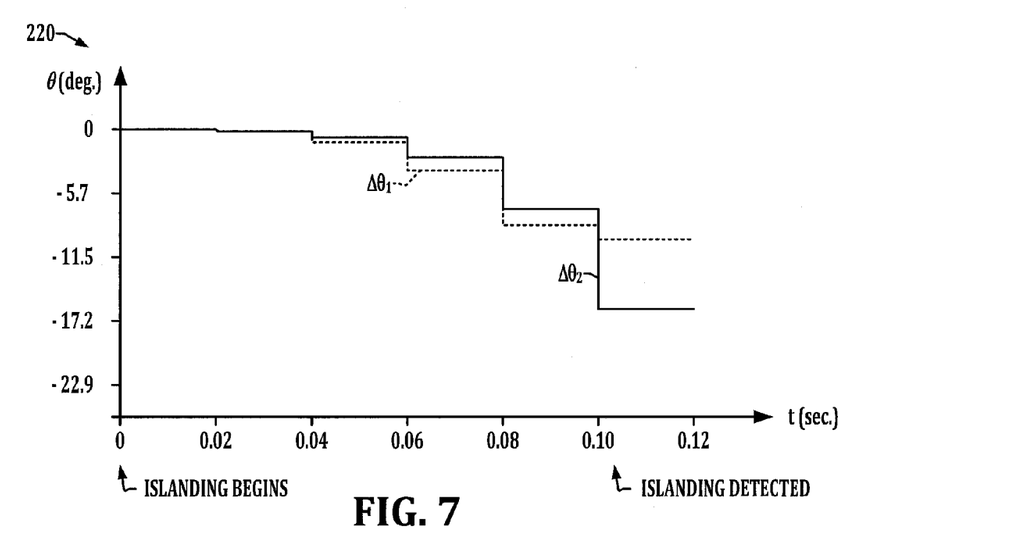
FIG. 7 is a phase angle disturbance curve showing selection and use of the disturbance having a maximum absolute value of the first and second phase angle disturbance curves over time in accordance with certain embodiments of the present disclosure.
Figure 8:
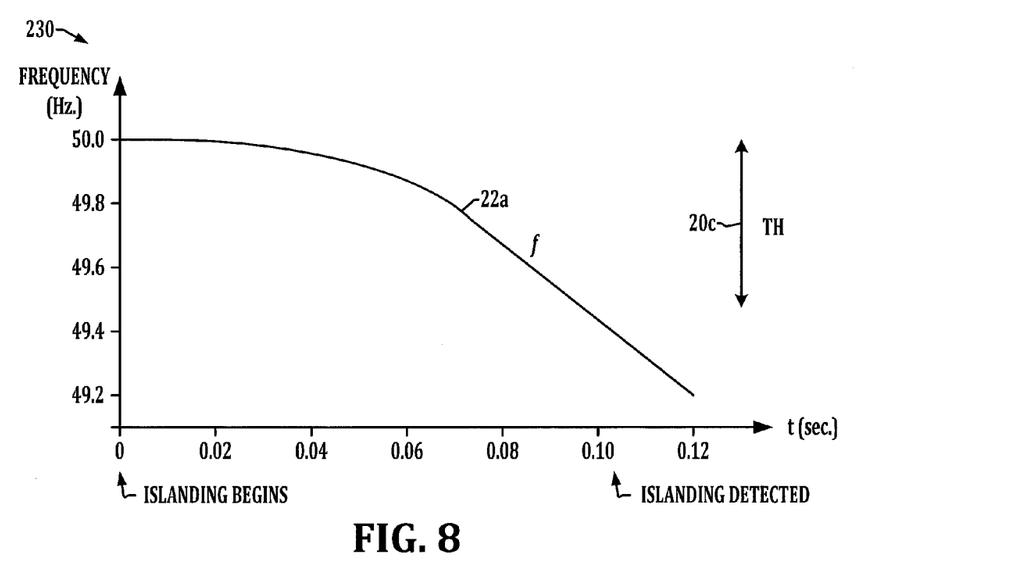
FIG. 8 is a graph showing grid tie converter output frequency as a function of time using the selected phase angle disturbance introduction concepts of the present disclosure during an islanding condition.

FIGS. 7 and 8 illustrate graphs 220 and 230, respectively, showing a phase angle disturbance curve depicting selection and use of a phase angle disturbance with the maximum absolute value of the first and second phase angle disturbance curves $\Delta\theta_1$ and $\Delta\theta_2$ as a function of time (FIG. 7) as well as grid tie converter output frequency f as a function of time (FIG. 8) for the above-mentioned condition in which islanding begins at time equals zero, and islanding is detected by the disclosed technique approximately 111 ms later. As seen in FIG. 7, this example employs steadily decreasing phase angle adjustments, although other embodiments are possible using increasing phase angle disturbances. FIG. 7 illustrates the situation in which the first phase angle disturbance $\Delta\theta_1$ is initially greater than the second phase angle disturbance $\Delta\theta_2$, with the above-described process 100 (FIG. 2) employing positive feedback in which the frequency f is iteratively measured and the new phase angle disturbances are recomputed at each iteration. Over time, as seen in FIG. 7, the absolute value of the second phase angle disturbance $\Delta\theta_2$ exceeds that of the first phase angle disturbance $\Delta\theta_1$ after a few iterations. As seen in FIG. 8, the measured operating frequency 22a at the point of common coupling 5 gradually is moved away from any potentially stable operating point, whereby the threshold 20c (TH) is eventually exceeded, and the grid tie converter 10 is thus able to detect the unintended islanding condition approximately 111 ms after the initial disconnection of the grid source 4.

In accordance with further aspects of the present disclosure, a non-transitory computer readable medium is provided, such as a computer memory, a memory within a power converter control system (e.g., controller 100), a CD-ROM, floppy disk, flash drive, database, server, computer, etc.), which includes computer executable instructions for performing the above-described methods. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for detecting unintentional islanding in a distributed power system, the method comprising:
   - measuring a frequency of a voltage at a point of common coupling of a grid tie converter with a load;
   - determining a first phase angle disturbance value according to the measured frequency and a first phase angle disturbance function;
   - determining a second phase angle disturbance value according to the measured frequency and a second phase angle disturbance function;
   - computing a final phase angle disturbance value according to the first and second phase angle disturbance values;
   - adjusting at least one grid side converter current control command reference value according to the final phase angle disturbance value;
   - generating grid side converter switching control signals for operating a grid side converter connected to the point of common coupling according to the at least one grid side converter current control command reference value;
   - again measuring the frequency of the voltage at the point of common coupling; and
   - selectively detecting unintentional islanding in the distributed power system based on the measured frequency of the voltage at the point of common coupling;
   - wherein the final phase angle disturbance value is computed according to the larger absolute value of the first and second phase angle disturbance values; and
   - wherein the first phase angle disturbance value is determined according to the measured frequency and the following first phase angle disturbance function:

$$\Delta\theta_1 = \theta_{m1} \sin((\Pi/2)*((f-f_g)/(f_{m1}-f_g))),$$

where f is the measured frequency, $f_g$ is the normal grid frequency, $f_{m1}$ is a predetermined first frequency different from the normal grid frequency $f_g$, and $\theta_{m1}$ is a predetermined first phase angle,
   wherein $\theta_{m1}$ and $f_{m1}$ are selected to meet the following inequality:

$$d(\Delta\theta_1)/df > d(\Delta\theta_{RLC})/df,$$

where $\theta_{RLC}$ is a load phase angle associated with the load determined according to the following function:

$$\theta_{RLC} = -a\tan[((R/\omega L_{QF=1}) - R\omega C_{QF=1})*Q_F],$$

where $R = V^2/P$, V being a voltage at the point of common coupling, and P being a power value at the point of common coupling, $\omega = 2\Pi f$, $Q_F$ is a quality factor of the load determined as $Q_F = R(C_{QF}/L_{QF})^{1/2}$, $L_{QF} = V^2/(2\Pi f P Q_F)$, and $C_{QF} = (PQ_F)/(2\Pi f V^2)$.

2. The method of claim 1, comprising detecting unintentional islanding in the distributed power system if the measured frequency of the voltage at the point of common coupling differs from a nominal grid frequency by more than a threshold value.

3. The method of claim 1, wherein the final phase angle disturbance value is computed according to the following formula:

$$\Delta\theta = \max[\text{abs}(\Delta\theta_1), \text{abs}(\Delta\theta_2)]*\text{sign}(f-f_g),$$

where $\Delta\theta_1$ is the first phase angle disturbance value, $\Delta\theta_2$ is the second phase angle disturbance value, f is the measured frequency, $f_g$ is the nominal grid frequency, and sign is the sign function with 1 for $f > f_g$, 0 for $f = f_g$, and $-1$ for $f < f_g$.

4. The method of claim 1, wherein the first phase angle disturbance function is a sine function, and wherein the second phase angle disturbance function is a tangent function.

5. The method of claim 4, wherein the second phase angle disturbance value is determined according to the measured frequency and the following second phase angle disturbance function:

$$\Delta\theta_2 = \theta_{m2} \tan((\Pi/2)*((f-f_g)/(f_{m2}-f_g))),$$

wherein $\theta_{m2}$ and $f_{m2}$ are selected such that the second phase angle disturbance value is greater than the first phase angle disturbance value at a crossing point frequency, where the crossing point frequency is a frequency where the first phase angle disturbance value is equal to the load phase angle.

6. A method for detecting unintentional islanding in a distributed power system, the method comprising:
   - measuring a frequency of a voltage at a point of common coupling of a grid tie converter with a load;
   - determining a first phase angle disturbance value according to the measured frequency and a first phase angle disturbance function;
   - determining a second phase angle disturbance value according to the measured frequency and a second phase angle disturbance function;
   - computing a final phase angle disturbance value according to the first and second phase angle disturbance values;
   - adjusting at least one grid side converter current control command reference value according to the final phase angle disturbance value;
   - generating grid side converter switching control signals for operating a grid side converter connected to the point of common coupling according to the at least one grid side converter current control command reference value;
   - again measuring the frequency of the voltage at the point of common coupling; and
   - selectively detecting unintentional islanding in the distributed power system based on the measured frequency of the voltage at the point of common coupling;
   - wherein the first phase angle disturbance function is a sine function, and wherein the second phase angle disturbance function is a tangent function: and
   - wherein the first phase angle disturbance value is determined according to the measured frequency and the following first phase angle disturbance function:

$$\Delta\theta_1 = \theta_{m1} \sin((\Pi/2)*((f-f_g)/(f_{m1}-f_g))),$$

where f is the measured frequency, $f_g$ is the nominal grid frequency, $f_{m1}$ is a predetermined first frequency different from the nominal grid frequency $f_g$, and $\theta_{m1}$ is a predetermined first phase angle,
   wherein $\theta_{m1}$ and $f_{m1}$ are selected to meet the following inequality:

$$d(\Delta\theta_1)/df > d(\Delta\theta_{RLC})/df,$$

where $\theta_{RLC}$ is a load phase angle associated with the load determined according to the following function:

$$\theta_{RLC} = -a\tan[((R/\omega L_{QF=1}) - R\omega C_{QF=1})*Q_F],$$

where $R = V^2/P$, V being a voltage at the point of common coupling, and P being a power value at the point of common coupling, $\omega = 2\Pi f$, $Q_F$ is a quality factor of the load determined as $Q_F = R(C_{QF}/L_{QF})^{1/2}$, $L_{QF} = V^2/(2\Pi f P Q_F)$, and $C_{QF} = (PQ_F)/(2\Pi f V^2)$.

7. The method of claim 6, wherein the final phase angle disturbance value is computed according to the larger absolute value of the first and second phase angle disturbance values.

8. The method of claim 6, wherein the final phase angle disturbance value is computed according to the following formula:

$$\Delta\theta = \max[\text{abs}(\Delta\theta_1), \text{abs}(\Delta\theta_2)]*\text{sign}(f-f_g),$$

where $\Delta\theta_1$ is the first phase angle disturbance value, $\Delta\theta_2$ is the second phase angle disturbance value, f is the measured frequency, $f_g$ is the nominal grid frequency, and sign is the sign function with 1 for f>$f_g$, 0 for f=$f_g$, and −1 for f<$f_g$.

9. The method of claim 6, wherein the second phase angle disturbance value is determined according to the measured frequency and the following second phase angle disturbance function:

$$\Delta\theta_2 = \theta_{m2} \tan((\Pi/2)*((f-f_g)/(f_{m2}-f_g))),$$

wherein $\theta_{m2}$ and $f_{m2}$ are selected such that the second phase angle disturbance value is greater than the first phase angle disturbance value at a crossing point frequency, where the crossing point frequency is a frequency where the first phase angle disturbance value is equal to the load phase angle.

10. The method of claim 6, comprising detecting unintentional islanding in the distributed power system if the measured frequency of the voltage at the point of common coupling differs from a nominal grid frequency by more than a threshold value.

11. A computer readable medium with computer executable instructions for detecting unintentional islanding in a distributed power system, computer readable medium including computer executable instructions for:
measuring a frequency of a voltage at a point of common coupling of a grid tie converter with a load;
determining a first phase angle disturbance value according to the measured frequency and a first phase angle disturbance function;
determining a second phase angle disturbance value according to the measured frequency and a second phase angle disturbance function;
computing a final phase angle disturbance value according to the first and second phase angle disturbance values;
adjusting at least one grid side converter current control command reference value according to the final phase angle disturbance value;
generating grid side converter switching control signals for operating a grid side converter connected to the point of common coupling according to the at least one grid side converter current control command reference value;
again measuring the frequency of the voltage at the point of common coupling; and
selectively detecting unintentional islanding in the distributed power system based on the measured frequency of the voltage at the point of common coupling;
wherein the final phase angle disturbance value is computed according to the larger absolute value of the first and second phase angle disturbance values; and
wherein the first phase angle disturbance value is determined according to the measured frequency and the following first phase angle disturbance function:

$$\Delta\theta_1 = \theta_{m1} \sin((\Pi/2)*((f-f_g)/(f_{m1}-f_g))),$$

where f is the measured frequency, $f_g$ is the nominal grid frequency, $f_{m1}$ is a predetermined first frequency different from the nominal grid frequency $f_g$, and $\theta_{m1}$ is a predetermined first phase angle,
wherein $\theta_{m1}$ and $f_{m1}$ are selected to meet the following inequality:

$$d(\Delta\theta_1)/df > d(\Delta\theta_{RLC})/df,$$

where $\theta_{RLC}$ is a load phase angle associated with the load determined according to the following function:

$$\theta_{RLC} = -a\tan[((R/\omega L_{QF=1}) - R\omega C_{QF=1})*Q_F],$$

where $R=V^2/P$, V being a voltage at the point of common coupling, and P being a power value at the point of common coupling, $\omega=2\Pi f$, $Q_F$ is a quality factor of the load determined as $Q_F = R(C_{QF}/L_{QF})^{1/2}$, $L_{QF} = V^2/(2\Pi f \cdot PQ_F)$, and $C_{QF} = (PQ_F)/(2\Pi f V^2)$.

12. A grid tie power converter, comprising:
a grid side converter stage comprising a plurality of switching devices coupled between a point of common coupling of a distributed power system and a DC bus, the grid side converter stage operative according to a plurality of grid side converter switching control signals to transfer power between the point of common coupling and the DC bus;
a grid side controller operative to provide the grid side converter switching control signals to the grid side converter stage, and comprising:
  a phase angle disturbance component operative to:
    determine a first phase angle disturbance value according to a frequency of a voltage at a point of common coupling and a first phase angle disturbance function,
    determine a second phase angle disturbance value according to the measured frequency and a second phase angle disturbance function, and
    compute a final phase angle disturbance value according to the first and second phase angle disturbance values; and
  a switching control component operative to:
    adjust at least one grid side converter current control command reference value according to the final phase angle disturbance value, and
    generate the grid side converter switching control signals for operating the grid side converter according to the at least one grid side converter current control command reference value;
wherein the grid side controller is operative to selectively detect unintentional islanding in the distributed power system based on the measured frequency of the voltage at the point of common coupling;
wherein the phase angle disturbance component is operative to compute the final phase angle disturbance value according to the larger absolute value of the first and second phase angle disturbance values; and
wherein the first phase angle disturbance value is determined according to the measured frequency and the following first phase angle disturbance function:

$$\Delta\theta_1 = \theta_{m1} \sin((\Pi/2)*((f-f_g)/(f_{m1}-f_g))),$$

where f is the measured frequency, $f_g$ is the nominal grid frequency, $f_{m1}$ is a predetermined first frequency different from the nominal grid frequency $f_g$, and $\theta_{m1}$ is a predetermined first phase angle,
wherein $\theta_{m1}$ and $f_{m1}$ are selected to meet the following inequality:

$$d(\Delta\theta_1)/df > d(\Delta\theta_{RLC})/df,$$

where $\theta_{RLC}$ is a load phase angle associated with the load determined according to the following function:

$$\theta_{RLC} = -a\tan[((R/\omega L_{QF=1}) - R\omega C_{QF=1})*Q_F],$$

where $R=V^2/P$, V being a voltage at the point of common coupling, and P being a power value at the point of common coupling, $\omega=2\Pi f$, $Q_F$ is a quality factor of the load determined as $Q_F = R(C_{QF}/L_{QF})^{1/2}$, $L_{QF} = V^2/(2\Pi f \cdot PQ_F)$, and $C_{QF} = (PQ_F)/(2\Pi f V^2)$.

13. The grid tie power converter of claim 12, wherein the phase angle disturbance component is operative to detect unintentional islanding in the distributed power system if the measured frequency of the voltage at the point of common coupling differs from a nominal grid frequency by more than a threshold value.

14. The grid tie power converter of claim 12, wherein the phase angle disturbance component is operative to compute the final phase angle disturbance value according to the following formula:

$$\Delta\theta = \max[abs(\Delta\theta_1), abs(\Delta\theta_2)] * sign(f-f_g),$$

where $\Delta\theta_1$ is the first phase angle disturbance value, $\Delta\theta_2$ is the second phase angle disturbance value, f is the measured frequency of the voltage at the point of common coupling, $f_g$ is the nominal grid frequency, and sign is the sign function with 1 for $f>f_g$, 0 for $f=f_g$, and −1 for $f<f_g$.

15. The grid tie power converter of claim 12, wherein the phase angle disturbance component is operative to determine the first phase angle disturbance value according to the frequency of the voltage at the point of common coupling and sine function, and to determine the second phase angle disturbance value according to the measured frequency and a tangent function.

16. A computer readable medium with computer executable instructions for detecting unintentional islanding in a distributed power system, computer readable medium including computer executable instructions for:
measuring a frequency of a voltage at a point of common coupling of a grid tie converter with a load;
determining a first phase angle disturbance value according to the measured frequency and a first phase angle disturbance function;
determining a second phase angle disturbance value according to the measured frequency and a second phase angle disturbance function;
computing a final phase angle disturbance value according to the first and second phase angle disturbance values;
adjusting at least one grid side converter current control command reference value according to the final phase angle disturbance value;
generating grid side converter switching control signals for operating a grid side converter connected to the point of common coupling according to the at least one grid side converter current control command reference value;
again measuring the frequency of the voltage at the point of common coupling; and
selectively detecting unintentional islanding in the distributed power system based on the measured frequency of the voltage at the point of common coupling;
wherein the first phase angle disturbance function is a sine function, and wherein the second phase angle disturbance function is a tangent function; and
wherein the first phase angle disturbance value is determined according to the measured frequency and the following first phase angle disturbance function:

$$\Delta\theta_1 = \theta_{m1} \sin((\Pi/2) * ((f-f_g)/(f_{m1}-f_g))),$$

where f is the measured frequency, $f_g$ is the nominal grid frequency, $f_{m1}$ is a predetermined first frequency different from the nominal grid frequency $f_g$, and $\theta_{m1}$ is a predetermined first phase angle,
wherein $\theta_{m1}$ and $f_{m1}$ are selected to meet the following inequality:

$$d(\Delta\theta_1)/df > d(\Delta\theta_{RLC})/df,$$

where $\theta_{RLC}$ is a load phase angle associated with the load determined according to the following function:

$$\theta_{RLC} = -a\tan[((R/\omega L_{QF=1}) - R\omega C_{QF=1}) - R\omega C_{QF=1}) * Q_F],$$

where $R = V^2/P$, V being a voltage at the point of common coupling, and P being a power value at the point of common coupling, $\omega = 2\Pi f$, $Q_F$ is a quality factor of the load determined as $Q_F = R(C_{QF}/L_{QF})^{1/2}$, $L_{QF} = V^2/(2\Pi f PQ_F)$, and $C_{QF} = (PQ_F)/(2\Pi f V^2)$.

17. A grid tie power converter, comprising:
a grid side converter stage comprising a plurality of switching devices coupled between a point of common coupling of a distributed power system and a DC bus, the grid side converter stage operative according to a plurality of grid side converter switching control signals to transfer power between the point of common coupling and the DC bus;
a grid side controller operative to provide the grid side converter switching control signals to the grid side converter stage, and comprising:
a phase angle disturbance component operative to:
determine a first phase angle disturbance value according to a frequency of a voltage at a point of common coupling and a first phase angle disturbance function,
determine a second phase angle disturbance value according to the measured frequency and a second phase angle disturbance function, and
compute a final phase angle disturbance value according to the first and second phase angle disturbance values; and
a switching control component operative to:
adjust at least one grid side converter current control command reference value according to the final phase angle disturbance value, and
generate the grid side converter switching control signals for operating the grid side converter according to the at least one grid side converter current control command reference value;
wherein the grid side controller is operative to selectively detect unintentional islanding in the distributed power system based on the measured frequency of the voltage at the point of common coupling;
wherein the first phase angle disturbance function is a sine function, and wherein the second phase angle disturbance function is a tangent function; and
wherein the first phase angle disturbance value is determined according to the measured frequency and the following first phase angle disturbance function:

$$\Delta\theta_1 = \theta_{m1} \sin((\Pi/2)/(f_{m1}-f_g)),$$

where f is the measured frequency, $f_g$ is the nominal grid frequency, $f_{m1}$ is a predetermined first frequency different from the nominal grid frequency $f_g$, and $\theta_{m1}$ is a predetermined first phase angle,
wherein $\theta_{m1}$ and $f_{m1}$ are selected to meet the following inequality:

$$d(\Delta\theta_1)/df > d(\Delta\theta_{RLC})/df,$$

where $\theta_{RLC}$ is a load phase angle associated with the load determined according to the following function:

$$\theta_{RLC} = -a\tan[((R/\omega L_{QF=1}) - R\omega C_{QF=1}) * Q_F],$$

where $R = V^2/P$, V being a voltage at the point of common coupling, and P being a power value at the point of common coupling, $\omega = 2\Pi f$, $Q_F$ is a quality factor of the load determined as $Q_F = R(C_{QF}/L_{QF})^{1/2}$, $L_{QF} = V^2/(2\Pi f PQ_F)$, and $C_{QF} = (PQ_F)/(2\Pi f V^2)$.

18. The grid tie power converter of claim 17, wherein the phase angle disturbance component is operative to detect unintentional islanding in the distributed power system if the measured frequency of the voltage at the point of common coupling differs from a nominal grid frequency by more than a threshold value.

19. The grid tie power converter of claim 17, wherein the phase angle disturbance component is operative to compute the final phase angle disturbance value according to the following formula:

$$\Delta\theta = \max[\mathrm{abs}(\Delta\theta_2)] * \mathrm{sign}(f-f_g),$$

where $\Delta\theta_1$ is the first phase angle disturbance value, $\Delta\theta_2$ is the second phase angle disturbance value, f is the measured frequency of the voltage at the point of common coupling, $f_g$ is the nominal grid frequency, and sign is the sign function with 1 for $f>f_g$ 0 for $f=f_g$, and −1 for $f<f_g$.

20. The grid tie power converter of claim 17, wherein the phase angle disturbance component is operative to determine the first phase angle disturbance value according to the frequency of the voltage at the point of common coupling and sine function, and to determine the second phase angle disturbance value according to the measured frequency and a tangent function.

* * * * *